L

(12) United States Patent
Danzebrink et al.

(10) Patent No.: US 7,985,798 B2
(45) Date of Patent: Jul. 26, 2011

(54) MIXED SILANES

(75) Inventors: Rolf Danzebrink, St. Ingbert (DE); Lucia Zimmermann, Heiligenwald (DE); Derek William Butler, Barry Vale of Glamorgan (GB); Peter Cheshire Hupfield, Carmathen (GB)

(73) Assignees: Nanogate AG, Saarbruecken (DE); Dow Corning Ltd., South Glamorgan (GB)

( * ) Notice: Subject to any disclaimer, the term of this patent is extended or adjusted under 35 U.S.C. 154(b) by 64 days.

(21) Appl. No.: 12/090,535

(22) PCT Filed: Oct. 18, 2006

(86) PCT No.: PCT/EP2006/067549
§ 371 (c)(1),
(2), (4) Date: Jul. 22, 2008

(87) PCT Pub. No.: WO2007/048745
PCT Pub. Date: May 3, 2007

(65) Prior Publication Data
US 2008/0281054 A1 Nov. 13, 2008

(30) Foreign Application Priority Data
Oct. 26, 2005 (EP) .................................. 05110033

(51) Int. Cl.
C08G 77/06 (2006.01)
C08G 77/18 (2006.01)
C08G 77/24 (2006.01)
C08G 77/26 (2006.01)

(52) U.S. Cl. .......................................... 525/38; 528/42

(58) Field of Classification Search .................. 525/477; 528/38, 42
See application file for complete search history.

(56) References Cited

U.S. PATENT DOCUMENTS

| | | | | |
|---|---|---|---|---|
| 3,355,424 A * | 11/1967 | Brown | ............................. | 528/33 |
| 5,030,745 A * | 7/1991 | Weber et al. | .................... | 556/407 |
| 5,442,011 A | 8/1995 | Halling et al. | | |
| 5,849,942 A * | 12/1998 | Standke et al. | ................. | 556/424 |
| 5,883,185 A * | 3/1999 | Matsumura et al. | ........... | 524/838 |
| 6,054,601 A | 4/2000 | Standke et al. | | |
| 6,251,989 B1 * | 6/2001 | Edelmann et al. | ............. | 524/837 |
| 6,491,838 B1 * | 12/2002 | Standke et al. | ................. | 252/8.57 |
| 6,582,620 B2 * | 6/2003 | Miyadai et al. | ................. | 252/8.62 |
| 7,026,398 B2 * | 4/2006 | Monkiewicz et al. | ......... | 525/100 |
| 7,344,235 B2 * | 3/2008 | Soga et al. | ....................... | 347/100 |
| 2006/0193988 A1 * | 8/2006 | Walter et al. | .................... | 427/387 |

FOREIGN PATENT DOCUMENTS

| | | | |
|---|---|---|---|
| EP | 78548 A2 * | 5/1983 | |
| EP | 0738771 A1 | 10/1996 | |
| WO | WO 2004076718 A1 * | 9/2004 | |

OTHER PUBLICATIONS

Data Sheet for Tego Dispers wetting and dispersing additives. Publication date unknown. Evonik Industries. Pertinent passage: footnote to table indicates Tego Dispers 610 S is a silicone containing compound.*

* cited by examiner

Primary Examiner — Randy Gulakowski
Assistant Examiner — Mike Dollinger
(74) Attorney, Agent, or Firm — Harness, Dickey & Pierce, PLC

(57) ABSTRACT

The present invention relates to a composition comprising at least one fluorosilane and at least one aminosilane, a condensation product of said fluorosilane and said aminosilane, and a surface protective agent made thereof.

19 Claims, No Drawings

US 7,985,798 B2

MIXED SILANES

FIELD

The present disclosure relates to a composition comprising a fluorosilane and an aminosilane, a condensation product of said fluorosilane and said aminosilane, and a surface protective agent made thereof.

BACKGROUND

Silanes are used for building protection as anti-corrosives, anti-graffiti-agents and water-repellents on substrates such as marble, sandstone, concrete, granite, sand-limestone, terra-cotta, clinker, split-face block or bricks. For such applications, the treatment products need to be preferably water-based and slightly acidic.

Fluorinated silanes exhibit the best performance with regard to simultaneous water-repellence and oil-repellence. Such fluorinated silanes so far possess several drawbacks. First of all, they do not easily form stable solutions, emulsions or dispersions with solvents having a dielectric constant greater than 30 at 20° C. Secondly, most of the fluorinated silanes used for building protection may release perfluoro-octanoic acid (PFOA), which has been found to persist and bioaccumulate in animal and human tissue and to accumulate in the liver where it inhibits glutathione peroxidase, a seleno-protein essential for thyroid hormone conversion, thereby also causing cancer (Occup Environ Med 60(10):722-9 (2003); Int J Cancer 78(4):491-5 (1998)).

U.S. Pat. No. 6,054,601 A discloses compositions of long-chain perfluorinated silanes and aminosilanes that undergo a reaction in aqueous media.

EP 0738771 A1 discloses aqueous compositions comprising long-chain perfluorinated silanes and aminosilanes. Compositions comprising less than 90% water are described to possess shelf instability.

U.S. Pat. No. 5,442,011 A discloses compositions of long-chain perfluorinated silanes and aminosilanes that undergo a reaction in aqueous media.

SUMMARY

Therefore, the problem underlying the present invention finally is to provide a stable and non-toxic surface protective agent resulting in good water- and oil-repellence deliverable in a solvent system with a high dielectric constant.

DETAILED DESCRIPTION

In a first embodiment, the problem underlying the present invention is solved by a reactive composition comprising, in particular consisting of (a) at least one fluorosilane of the general formula I $$R_f\text{—}SiX_3 \quad \text{(formula I)},$$

wherein

X is selected from the group of alkoxy, halide, oxime, carboxyl, phenoxide and polyether, and $R_f$ is a straight, branched or cyclic residue of the general formula II or III $$\text{—Y—}R_f \quad \text{(formula II) or}$$

$$\text{—Y—}(SiR_1R_2O)_x Si\, R_1R_2\text{—Y—}R_f \quad \text{(formula III)},$$

wherein

Y is a divalent organic moiety selected from the group of —(CH$_2$)$_n$—, —CO$_2$—, —O—, —CONH—, -Ph-, —SO$_2$—, and —SO$_2$NH—, wherein n is an integer from 1 to 30, $R_{f'}$ is a C1 to C30 linear or branched perfluoralkylene group, $R_1$ and $R_2$ are independently selected from monovalent organic residues, x is an integer from 0 to 5, and (b) and at least one aminosilane of the general formula IV $$R_a\text{—}SiR_3R_4R_5 \quad \text{(formula IV)},$$

where $R_a$ is a straight, branched or cyclic alkyl residue comprising 1 to 7 carbon atoms and at least one primary, secondary, ternary or quaternary, preferably being protonated, amino-group, $R_3$ and $R_4$ are independently selected from —$R_a$, —$OR_6$ and/or —$R_6$, and $R_5$ is —$OR_6$, and $R_6$ is a straight, branched or cyclic alkyl residue comprising 1 to 3 carbon atoms.

Protonated in the sense of the invention does not necessarily mean a positive charge on the nitrogen atom. It just means that at least one hydrogen atom is connected to the nitrogen atom.

The composition according to the present invention is preferably non-aqueous. "non-aqueous" in the sense of the present invention means that no additional water is added. This does not exclude usual water traces in the starting materials, but excludes the addition of water to the reaction system. Preferably, the composition comprises less than 1 wt. % water, particularly preferred less than 0.1 wt. % water. This is of particular advantage, since it has been found that a composition comprising water will lead to mostly non-hydrolysable condensation products and surface protective agents. Compared to the findings of EP 0738771 A1, surprisingly it has been found that compared to the stable solutions in water with fluorosilanes with at least 8 carbon atom in the fluorinated chain such as the compositions in EP 0738771 A1, the non-aqueous compositions according to the present invention exhibit a high stability and shelf-life with fluorinated alkylsilanes with carbon chain lengths of less than 8 carbon atoms due to their low water content.

Preferably, $R_f$ comprises 1 to 8 carbon atoms. Particularly, $R_f$ is (a) selected from the group of CF$_3$—, CF$_3$CF$_2$—, CF$_3$(CF$_2$)$_3$—, C$_3$F$_7$—, (CF$_3$)$_2$CF—, C$_4$F$_9$—, C$_5$F$_{11}$— or C$_6$F$_{13}$— or (b) a perflourinated polyether of the general formula V $$F\text{—}(CF_2)_r\text{—}(OC_3F_6)_s\text{—}(OC_2F_4)_t\text{—}(OCF_2)_u \quad \text{(formula V)},$$

wherein r is an integer in the range from 1 to 3, and s, t, and u are independently integers in the range from 0 to 200. These perfluorinated polyethers may preferably be homopolymers or block-copolymers comprising units selected from the group —(CF(CF$_3$)—CF$_2$—O)—, —(CF$_2$—CF$_2$—CF$_2$—O)—, —(CF$_2$—CF$_2$)—. These polyether residues are preferably terminated by $R_f$ as defined above.

$R_5$ and $R_6$ are preferably the same or different. Examples of such groups are C1 to C30 linear or branched alkylene group, an aromatic containing group, an aminoalkyl containing group, and a fluoroalkyl containing group.

Advantageously, X is a halide selected from the group of F, Br, Cl and I, an alkoxide $OR_7$ wherein $R_7$ is a C1 to C22 linear or branched alkylene group, an oxime $R_8R_9C=N$—O, wherein $R_8$ and $R_9$ are independently selected from C1 to C30 linear or branched alkylene groups, wherein $R_8$ and $R_9$ may be same or different, a carboxyl residue $R_{10}CO_2$ wherein $R_{10}$ is a C1 to C30 linear or branched alkylene group, a phenoxide M-Ph-O—, where M is hydrogen or a monovalent organic group, or a polyether selected from the group of polyalkylene oxides containing one or more of the following repeating structural units $(CH_2CH_2O)_q$, or $(CH_3CHCH_2O)_q$ wherein q is a value in the range from 1 to 100, terminated by a C1 to C30 linear or branched alklylene group.

Preferably, Y is a moiety selected from the group of —$(CH_2)_o$—, —$CO_2$—, —$(CH_2)_o$—$CO_2$—$(CH_2)_m$—, —$(CH_2)_o$—O—$(CH_2)_m$, —$(CH_2)_o$—CONH—$(CH_2)_m$, —$(CH_2)_o$-Ph-$(CH_2)_m$, —$(CH_2)_o$—$SO_2$—$(CH_2)_m$, and —$(CH_2)_o$—$SO_2$NH—$(CH_2)_m$, —$SO_2$—O—, —$SO_2$NH—, —$CH_2$=CH—, and —$CH_2$=CH—$(CH_2)_o$—, wherein o is a number in the range from 1 to 30 and m is a number in the range from 0 to 30, in particular wherein the divalent organic group may also contain branched alkylene groups.

Y—$R_f$ may preferably comprise a unit of a starting olefin and preferably is a residue selected from the group
$(CH_2)_2R_f$, $CH_2$=CH—$R_f$,
$(CH_2)_6R_f$, $CH_2$=$CH(CH_2)_4$ $R_f$,
$(CH_2)_3O(CH_2)_2R_f$, $CH_2$=$CHCH_2O(CH_2)_2R_f$,
$(CH_2)_{10}CO_2(CH_2)_2R_f$, $CH_2$=$CH(CH_2)_8CO_2(CH_2)_2R_f$,
$(CH_2)NHCOR_f$, and $CH_2$=$CHCH_2NHCOR_f$.

$R_f$ is preferably a C1 to C30 linear or branched perfluoroalkylene group, in particular selected from the group $CF_3$—, $CF_3CF_2$, $CF_3(CF_2)_3$—, and $(CF_3)_2CF$—.

$R_f$ may preferably also be a perflourinated polyether of the general formula V

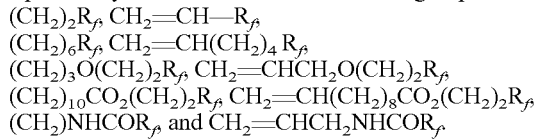

$$F—(CF_2)_q—(OC_3F_6)_m—(OC_2F_4)_n—(OCF_2)_o \quad \text{(formula (V)},$$

wherein q is an integer in the range from 1 to 3; m, n, and o are independently integers in the range from 0 to 200.

Advantageously, $R_f$ is a straight, branched or cyclic perfluorinated alkyl residue comprising 1 to 30 carbon atoms, $R_1$ and $R_2$ are independently selected from —$R_f$, —$CH_2$—$CH_2$—$R_f$, —$OR_6$ and/or —$R_6$, and where $R_3$ is —$OR_6$.

Preferably, $R_1$ or $R_2$ are independently selected from the group of C1 to C30 linear or branched alkylene groups, aromatic containing groups, aminoalkyl containing groups, and fluoroalkyl containing groups.

Preferably, in the composition the molar ratio of $R_f$-groups of formula I to amino-groups present in formula IV is in a range from 2:1 to 6:1, particularly in a range from 2.5:1 to 4:1. This ratio has been found to be particularly stable in solution with solvents having a dielectric constant of at least 30 measured at 20° C. in case of such molar ratios.

The invention is of particular advantage, if $R_f$ comprises 1 to 6 carbon atoms, in particular 3 to 6, more preferred 4 to 6, even more preferred 3 to 5 carbon atoms, since then the resulting surface protective agent will definitely not release PFOA, and since oil-repellence was found to be best in this range.

$R_a$ favorably comprises at least as many carbon atoms as the longest residue of said fluorosilane, since this has been found to yield the most stable solutions, emulsions or dispersions.

Preferably, at most one, in particular none of residues X is $R_f$ or —$CH_2$—$CH_2$—$R_f$ and/or at most one, in particular none of $R_3$, $R_4$ and $R_5$ is $R_a$, since then high hydrophobicity of the treated surface material could be achieved together with good stability of the treatment solution, emulsion or dispersion.

Said fluorosilane may advantageously be present in the composition in a range from 40 to 75 weight % and said aminosilane may advantageously be present in the composition in a range from 10 to 30 weight %.

Preferably, the composition according to the present invention comprises at least one acid in a range between 1 to 90 wt. %, even more preferred in a range between 20 and 50 wt. %, most preferred in a range between 30 and 40 wt. %.

The composition according to the present invention may comprise an additional solvent system comprising a single solvent or a mixture of solvents, where the solvent system has a dielectric constant of at least 30 measured at 20° C. Of particular advantage is a solvent or solvent mixture selected from the group of alcohols, acetone, water, ethers or N-methylformamide. Said solvent system may preferably be present in the composition in a range from 4 to 20 weight %.

X, $R_3$, $R_4$, and/or $R_5$ are preferably alkoxy groups, in particular ethoxy or methoxy groups, since then the resulting condensation product exhibits a higher stability due to better cross linking between said fluorosilane and said aminosilane.

Said amino group is preferably a terminal group, in case the residue is not cyclic, i.e. the amino group is attached to a primary carbon atom with only one bond to another carbon atom. The amino group may preferably be —$NH_2$ or substituted, in particular with one or two —$CH_2CH_2NH_2$, phenyl groups or cyclohexyl groups. Preferably, the amino group is attached to a straight alkyl chain. These features result in particularly stable solutions, emulsions or dispersions.

Said aminosilane according to the present invention preferably comprises in the complete molecule 4 to 17 carbon atoms, 1 to 4 nitrogen atoms, 2 to 5 oxygen atoms, and 13 to 37 hydrogen atoms. The boiling point thereof is preferably in a range between 100 and 280° C., whereas the molecular weight thereof is preferably in a range from 170 to 270 g/mol. The flash point thereof is preferably in a range between 70 to 120° C. Such aminosilane is of advantage, since it poses no fire hazard during normal handling and at the same time results in optimal hydrophobicity of the resulting coating in combination with the fluorosilane.

In a further embodiment, the problem underlying the present invention is solved by a process preparing a reactive composition by combining a fluorosilane and an aminosilane each according to the composition of the present invention followed by an acid treatment. The reaction time for protonation is preferably in a range from 1 to 20 min, even more preferred in a range from 5 to 15 min. The reaction temperature is preferably in a range of from 40 to 80° C., even more preferred in a range of from 60 to 75° C.

In a further embodiment, the problem underlying the present invention is solved by a condensation product of an fluorosilane of the general formula II and/or III and an aminosilane of the general formula IV (master batch), obtainable by a catalytic promoted treatment of a mixture of said fluorosilane and said aminosilane, in particular by an acid treatment.

Preferably, this condensation product is non-aqueous. Preferably, the condensation product only exists in a chemical system comprising less than 1 wt. % water, particularly preferred less than 0.1 wt. % water. Surprisingly, it has been found that only a non-aqueous reaction product is water hydrolysable at a later stage (e.g. as part of a surface protective agent). Also, such reaction product has been found to be much more stable (shelf-life) compared to condensation products produced in an aqueous system.

Preferably, said condensation product is clear and exhibits a haze value of at most 10%. The haze can be measured according to ASTM D 1003 using 10 mm thick samples of solution, e.g. in cuvettes.

It is of particular advantage, if the fluorosilane undergoes the condensation reaction in the presence of a further hydrophilic silane. It is of also particular advantage, if the fluorosilane undergoes the condensation reaction in the presence of no additional water, i.e. a non-aqueous system. Preferably this hydrophilic silane is a polar material with a dielectric constant of at least 5. Preferably this silane may also comprise monovalent organic groups Z such as epoxide groups. The molar ratio of the fluorosilane to the hydrophilic silane is preferably in a range from 20 to 1. The hydrophilic silane is conforming with the general formula

$$R_{11}R_{12}MeSi\text{—}Y\text{—}Z \quad \text{(formula VI)},$$

where $R_{11}$ and $R_{12}$ are independently selected from the group of $R_3$ or Me, and Z is a polar monovalent organic group.

Said condensation product according to the present invention exhibits high stability toward the chemical environment due to the fluorosilane and the aminosilane crosslinked with each other, and at the same time results in highly stable solutions, emulsions or dispersions thereof, while still providing highly hydrophobic and oleophobic surface materials treated with such condensation product.

Preferably, the acid used exhibits a $pK_a$ value in a range from 3 to 7, particularly in a range from 3.5 to 5.5. If the $pK_a$ value is too low, the degree of cross linkage is too high, insoluble or indispersible particles of too large size are built. If the $pK_a$ value is too high, the degree of cross linkage is insufficient to form stable solutions, emulsions and dispersions.

The acid is a Lewis acid or a Bronsted acid preferably selected from the group of boric acid, aceto acetic acid, citric acid, crotonic acid, formic acid, fumaric acid, glyceric acid, glycolic acid, lactic acid, malic acid, tartaric acid, and/or acetic acid.

The shape of the condensation product is preferably particles, in particular particles with a medium particle size in a range from 1 to 1000 nm, in particular in a range from 5 to 100 nm. The monodispersity of the condensation product is preferably in a range from 1 to 15 nm. In case the particle size is too large, the penetration into a substrate to be coated becomes worse. Also the stability of a dispersion, e.g. in form of a surface protective agent, containing such larger than preferred particles suffers.

The condensation product preferably exists within a solvent system. This solvent system preferably exhibits a pH in the range from 4 to 5. This pH is preferably accomplished by addition of a Lewis acid or a Bronsted acid.

In a further embodiment, the problem underlying the present invention is solved by a process for obtaining a condensation product according to the invention, characterized in that it comprises at least the step of adding an acid to the composition according to the invention.

Preferably, this process is a non-aqueous process, i.e. a process, in which no additional water is added.

Preferably, the weight ratio of the acid to be added to the composition according to the invention is in a range between 1:1 to 1:4, in particular in a range between 1:1.5 to 1:2.5. In view of the exothermic cross linkage reaction, preferably no extra heat is provided during or before addition of the acid to prevent degradation of sensitive ingredients also present in the composition.

In a further embodiment, the problem underlying the present invention is solved by a process for the preparation of a fluorosilane according to formula I, II and/or III, characterized by the steps of hydrosilylation of an unsaturated C—C or C—O bond and following alkoxylative substitution of residues attached to the silicon atom after hydrosilylation.

In a further embodiment, the problem underlying the present invention is solved by a surface protective agent comprising said composition according to the invention and/or the condensation product according to the invention further comprising common additives for surface protective agents.

For the first time, a surface protective agent is provided comprising fluorosilanes suitable for a highly polar solvent system.

Preferably, the surface protective agent according to the present invention comprises active components in a range from 20 to 40 wt. %. Active component is preferably the condensation product according to the present invention.

Said surface protective agent according to the present invention may preferably comprise a solvent or a mixture of solvents, where the solvent or the mixture of solvents has a dielectric constant of at least 30 measured at 20° C. Of particular advantage is a solvent or solvent mixture selected from the group of alcohols, acetone, water, ethers or N-methylformamide. Such high dielectric constant solvent system has been found to adsorb to and infiltrate best polar surface materials such as for example concrete or limestone. Preferably this solvent or mixture of solvents is present in the surface protective agent in an amount in the range from 60 to 80 wt. %.

For this purpose, the surface protective agent according to the present invention preferably comprises at most 5 weight % of solvents with a dielectric constant up to 29 measured at 20° C. and at the same time comprises at least 10, in particular at least 90 weight % of solvents with a dielectric constant of at least 30 measured at 20° C.

Said surface protective agent preferably comprises 0.1 to 10 weight % of known additives such as a compound or mixture of compounds selected from the group of silicones/siloxanes, acrylic compounds, melamine derivatives, and waxes for better adhesion to the surface material as well as improved hydrophobicity and oleophobicity of the impregnated surface material.

Preferably, the surface protective agent according to the present invention exhibits a pH value in a range from 3 to 6.5 to have best compatibility with and efficiency on the substrate such as for example sandstone, limestone or concrete.

The invention is of particular advantage, if the additives are selected from the group acrylics, waxes, silicones, extenders, and polyurethanes. Preferably, the additives are present in an amount from 0.5 to 5 weight % to improve the overall performance.

Said surface protective agent preferably comprises a diluted solution, emulsion, or dispersion of the composition and/or the condensation product according to the invention for best hydrophobicity and oleophobicity of the impregnated surface materials while at the same time providing the surface protective agent as a stable solution, emulsion or dispersion. Preferably, said surface protective agent comprises an amount of 0.1 to 15, preferably 1 to 7% by weight of fluorinated compounds namely of said fluorosilanes or of the master batch or the composition or the condensation product according to the present invention.

A stable solution, emulsion or dispersion in the sense of the present invention refers to a solution, emulsion or dispersion exhibiting no significant precipitation or phase separation during storage at room temperature and normal pressure for seven days, preferably for 5 weeks (shelf-life).

In a further embodiment, the problem underlying the present invention is solved by a method for obtaining the surface protective agent according to the present invention comprising at least the step of mixing said composition or condensation product with a solvent system having a dielectric constant of at least 30 measured at 20° C. and additional additives.

In a last embodiment, the problem underlying the present invention is solved by a surface material treated with said surface protective agent according to the present invention.

Said surface material is preferably selected from the group natural stone, marble, sandstone, concrete, granite, sand limestone, terracotta, clinker, split-face block or brick.

The composition according to the present invention may be used for coatings (with e.g. greaseproof, food-release, easy-clean, anti-stain, oil- or water-repellent effect) on natural or artificial stone, on decorative elements such as walls, on household furnishing, on textile material such as woven, non-woven, or carpets, on leather, on plastics, on glass, on metal (e.g. as a mould release coating), on ceramic, on wood or on paper. The surface protective agent according to the present invention is particularly useful as a building protective agent.

The oleophobicity and hydrophobicity of the treated surface material is evaluated using contact angle measurement. The contact angle of linseed oil against air on the treated surface material is at least 50°, whereas the contact angle of water against air on the treated surface material is at least 100°. The contact angle can be measured at room temperature and normal pressure using sessile drop measurement of drops with a volume of 0,5 ml using a DSA 100 (Krüss GmbH).

EXAMPLES

Abbreviations:
FTS=3,3,4,4,5,5,6,6,7,7,8,8,8-Tridecafluoroctyltriethoxysilane
B3958=Nonafluorohexyl-1,1,2,2-H-trimethoxysilan
AMMO=3-Aminopropyltrimethoxysilane
AMEO=3-Aminopropyltriethoxysilane
HAC=acetic acid (100% (glacial acetic acid)
HOOC=Formic acid (100%)
HCl=hydrochloric acid (37%)
B2858=heptafluoroisohexyl-1,1,2,2,3,3-H-trimethoxysilane Example 1

Surface Protective Agent for Stone

To 6 g Nonafluorohexyl-1,1,2,2-H-trimethoxysilane (B3958), 12 g 3-Amino-propyl-trimethoxysilane (AMMO) was added and stirred at ambient temperature for 5 min. to form the composition. 4 g concentrated acetic acid was added and stirred for 5 min., where after 1.3 g deionized water was added under reflux to form the condensation product. This condensation product was diluted with 400 g of methanol. 20 g of the silicone emulsion Z 66-83 (Dow Corning) was added to form the surface protective agent. 500 g of this surface protective agent was applied to 1 m² sand-limestone and dried for 5 days. After drying, olive-oil, green-tea, coffee, red wine, coca cola and ketchup stain could be easily wiped off using water and towel.

Water pickup after 24 h was approximately 260 g/m².

Example 2

Surface Protective Agent for Wood 3 g Nonafluorohexyl-1,1,2,2-H-trimethoxysilane were stirred with 3 g glycidyloxypropyl-3-triethoxysilane at ambient temperature for 1 minute. To this mixture were added 100 g methanol and stirred for 1 minute. 10 g acetic acid (25%) were added under reflux and the resulting mixture was stirred for 30 minutes. After subsequent addition of 1 g 3-aminopropyltrimethoxysilane the mixture was stirred for an additional 10 minutes to form the condensation product. The mixture was applied to a wooden surface. After curing for 5 days, the treated wood surface exhibits a strongly diminished water take-up behavior. Water is repelled by the treated wood surface.

Example 3

Surface Protective Agent for Textiles

To 6 g Nonafluorohexyl-1,1,2,2-H-trimethoxysilane 1 g 3-aminopropyltrimethoxysilane is added drop wise, with subsequent addition of 4 g acetic acid (100% (glacial acetic acid)) under reflux to form the condensation product. After stirring for 1 minute, 1.5 g dematerialized water was added and the mixture was stirred for 4 hours. Demineralized water is added to the resulting clear solution to give 3000 g of treatment agent. Textiles were immersed in this protective agent and dried in air. Quality of the resulting protective coating is determined to be better than the quality of known protective coatings according to DIN EN24920 and ISO2 (70).

Example 4

Surface Protective Agent for Stone

A 250 ml three necked flask equipped with a stirrer, condenser, thermometer and dropping funnel was charged with 16.0 g of AMMO. Drop wise 36 g of acetic acid (glacial acetic acid) were added to form the quaternary amine. White fume was forming. After stirring for 10 minutes the white fume is drained. The reaction was exothermic and the temperature rose up to 58° C. Then 48 g of FTS was added to form a composition. The temperature was adjusted to 65° C. and was maintained for 48 hours by heating. After cooling down to ambient temperature, this intermediate condensation product was stable for more than 1 year when storing at ambient temperature and was soluble with water in all concentrations.

2.5% of this intermediate in water and some commercial additives like silicones gave best performance on sandstone and concrete. The diluted final product was stable (shelf-life) for more than 1 year.

Example 5

Surface Protective Agent for Stone

The procedure of Example 4 was repeated except that B3958 was used for the FTS. The diluted final product was stable (shelf-life) for more than 1 year.

Example 6

Surface Protective Agent for Stone

The procedure of Example 1 was repeated except that B2858 was used for the FTS. The diluted final product was stable (shelf-life) for more than 1 year.

Comparative Example 1
(according to EP 0738771 A1)

A 250 ml three necked flask equipped with a stirrer, condenser, thermometer and dropping funnel was charged with 17.07 g of AMEO. Then 35.53 g of FTS was added. 42.1 g IPA is given to the mixture to form one phase. 1.58 g of HOOC and 0.05 g of HCl and 3.67 g of water were added drop wise. The temperature was adjusted to 80° C. and maintained for 3 hours by heating. After cooling down to ambient temperature this intermediate was not stable for more than 4 weeks when storing at ambient temperature and was soluble with water only in low concentrations such as 1 wt. %.

2.5% of this intermediate in water and some commercial additives like silicones gave satisfactory performance on sandstone and concrete. The diluted final product was not stable for more than 4 weeks (shelf-life).

Comparative Example 2
(according to EP 0738771 A1):

A 250 ml three necked flask equipped with a stirrer, condenser, thermometer and dropping funnel was charged with 46.5 g of B3958. Then 15.5 g of AMMO were added. 34.9 g of HAC were added drop wise. A two phase mixture was obtained. By dropping 3.1 g of water to the mixture, a hydrolysation was initiated and the temperature rose up to 60° C. After cooling down to ambient temperature, the formed intermediate was soluble with water in low concentrations such as 1 wt. %. The stability (shelf-life) of the diluted and the intermediate is restricted to at most 4 weeks.

Comparative Example 3
(according to EP 0738771 A1):

The procedure of Comparative Example 1 was repeated except that the amount of water used was 9.74 g. Like in Comparative Example 2, the formed intermediate was also soluble with water in low concentrations such as 1 wt. %. The stability (shelf-life) of the diluted and the intermediate was restricted to at most 4 weeks.

What is claimed is:

1. A process for making a non-aqueous condensation product of a fluorosilane and an aminosilane, comprising reacting a fluorosilane and an aminosilane in the presence of an acid and with no added water to make the condensation product, wherein
(a) the fluorosilane is of general formula I $$R_f\!-\!SiX_3 \quad \text{(formula I)},$$

wherein
X is selected from the group of alkoxy, halide, oxime, carboxyl, phenoxide and polyether, and
$R_f$ is a straight, branched or cyclic residue of the general formula II or III $$-\!Y\!-\!R_f \quad \text{(formula II) or}$$

$$-\!Y\!-\!(SiR_1R_2O)_x SiR_1R_2\!-\!Y\!-\!R_f \quad \text{(formula III)},$$

wherein
Y is a divalent organic moiety selected from $-(CH_2)_o-$, $-CO_2-$, $-(CH_2)_o-CO_2-(CH_2)_m-$, $-(CH_2)_o-O-(CH_2)_m-$, $-(CH_2)_o-CONH-(CH_2)_m-$, $-(CH_2)_o-Ph-(CH_2)_m-$, $-(CH_2)_o-SO_2-(CH_2)_m-$, $-(CH_2)_o-SO_2NH-(CH_2)_m-$, $-SO_2-O-$, $-CH=CH-$, $-CH=CH-(CH_2)_o-$, $-O-$, $-CONH-$, $-Ph-$, $-SO_2-$, and $-SO_2NH-$, wherein o is a number in the range from 1 to 30 and m is a number in the range from 0 to 30,
$R_f$ is a C1 to C30 linear or branched perfluoroalkyl group or a perfluorinated polyether,
$R_1$ and $R_2$ are independently selected from monovalent organic residues,
x is an integer from 0 to 5, and
(b) the aminosilane is of general formula IV $$R_a\!-\!SiR_3R_4R_5 \quad \text{(formula IV)},$$

where
$R_a$ is a straight, branched or cyclic alkyl residue comprising 1 to 7 carbon atoms and at least one primary, secondary, ternary or quaternary amino-group, $R_3$ and $R_4$ are independently selected from $-R_a$, $-OR_6$ and $-R_6$, and $R_5$ is $-OR_6$,
$R_6$ is a straight, branched or cyclic alkyl residue comprising 1 to 3 carbon atoms, and
the molar ratio of $R_f$-groups of formula I to amino-groups present in formula IV is in a range from 2:1 to 6:1.

2. The process according to claim 1, wherein X is
a halide selected from the group of F, Br, Cl and I,
an alkoxide $OR_7$ wherein $R_7$ is a C1 to C22 linear or branched alkylene group,
an oxime $R_8R_9C=N-O$, wherein $R_8$ and $R_9$ are independently selected from C1 to C30 linear or branched alkylene groups, wherein $R_8$ and $R_9$ may be same or different,
a carboxyl residue $R_{10}CO_2$ wherein $R_{10}$ is a C1 to C30 linear or branched alkylene group,
a phenoxide M-Ph-O—, where M is hydrogen or a monovalent organic group, or
a polyether selected from the group of polyalkylene oxides containing one or more of the following repeating structural units $(CH_2CH_2O)_q$, or $(CH_3CHCH_2O)_q$ wherein q is a value in the range from 1 to 100, terminated by a C1 to C30 linear or branched alklylene group.

3. The process according to claim 1, wherein Y is selected from $-(CH_2)_n-$, $-CO_2-$, $-O-$, $-CONH-$, $-Ph-$, $-SO_2-$, $-SO_2NH-$, and branched alkylene, wherein n is an integer from 1 to 30.

4. The process according to claim 1, wherein $R_f$ is
(a) selected from $CF_3-$, $CF_3CF_2-$, $CF_3(CF_2)_3-$, $C_3F_7-$, $(CF_3)_2CF-$, $C_4F_9-$, $C_5F_{11}-$ and $C_6F_{13}-$, or
(b) a perfluorinated polyether of the general formula V $$F\!-\!(CF_2)_r\!-\!(OC_3F_6)_s\!-\!(OC_2F_4)_t\!-\!(OCF_2)_u \quad \text{(formula V)},$$

wherein r is an integer in the range from 1 to 3, and s, t, and u are independently integers in the range from 0 to 200.

5. The process according to claim 1, wherein $R_f$ comprises 1 to 6 carbon atoms.

6. The process according to claim 1, wherein $R_1$ or $R_2$ of formula III are independently selected from the group of C1 to C30 linear or branched alkylene groups, aromatic containing groups, aminoalkyl containing groups, and fluoroalkyl containing groups.

7. The process according to claim 1, wherein X, $R_3$, $R_4$, and/or $R_5$ independently are selected from the group of alkoxy groups, in particular ethoxy or methoxy groups.

8. The process according to claim 1, wherein the molar ratio of $R_f$-groups of formula I to amino-groups present in formula IV is in a range from 2.5:1 to 4:1.

9. The process according to claim 1, comprising further reacting with a hydrophilic silane conforming with the general formula $$R_{11}R_{12}MeSi\!-\!Y\!-\!Z \quad \text{(formula VI)},$$

where $R_{11}$ and $R_{12}$ are independently selected from $R_3$ and Me, and
Z is a polar monovalent organic group.

10. The process according to any one of claims 1 to 9, wherein the acid is present in a range between 20 and 50 wt. % based on the total weight of fluorosilane, aminosilane, and acid.

11. The process according to claim 1 wherein said fluorosilane and/or the aminosilane are reacted in protonated form.

12. A composition comprising the product of the process of claim 1 and a solvent having a dielectric constant of at least 30 measured at 20° C.

13. The-according to claim 12, wherein the acid exhibits a p$K_a$ value in a range from 3 to 7.

14. The composition according to claim 12, wherein the solvent is present in an amount of 4 to 20% by weight.

15. The composition according to claim 12 or 13 wherein the solvent comprises one of alcohol, acetone, water, ether, and N-methylformamide.

16. A surface protective agent composition comprising a composition according to claim 12 and further comprising common additives for surface protective agents.

17. The surface protective agent composition according to claim 16, comprising 0.5 to 5 weight % of a compound or mixture of compounds selected from the group of silicones/siloxanes, acrylic compounds, melamine derivatives, and waxes.

18. The process according to claim 10, wherein the acid is present in a range between 30 and 40 wt. %.

19. The composition according to claim 12, wherein the acid exhibits a pKa value in a range from 4 to 5.5.

* * * * *